(12) United States Patent
Long et al.

(10) Patent No.: US 11,108,457 B2
(45) Date of Patent: Aug. 31, 2021

(54) SPATIAL ENERGY RANK DETECTOR AND HIGH-SPEED ALARM

(71) Applicant: BAE Systems Information and Electronic Systems Integration Inc., Nashua, NH (US)

(72) Inventors: Ryan E. Long, Epsom, NH (US); Thomas R. Vaccaro, Hudson, NH (US)

(73) Assignee: BAE Systems Information and Electronic Systems Integration Inc., Nashua, NH (US)

( * ) Notice: Subject to any disclaimer, the term of this patent is extended or adjusted under 35 U.S.C. 154(b) by 161 days.

(21) Appl. No.: 16/704,038

(22) Filed: Dec. 5, 2019

(65) Prior Publication Data

US 2021/0175956 A1 Jun. 10, 2021

(51) Int. Cl.
*H04B 7/08* (2006.01)
*G01S 7/02* (2006.01)
*H01Q 21/00* (2006.01)
*H01Q 3/26* (2006.01)

(52) U.S. Cl.
CPC .............. *H04B 7/086* (2013.01); *G01S 7/021* (2013.01); *H01Q 3/26* (2013.01); *H01Q 21/0025* (2013.01)

(58) Field of Classification Search
CPC ..... G01S 1/02; G01S 3/74; G01S 3/14; G01S 3/46; G01S 3/043; G01S 7/021; H01Q 3/26; H01Q 21/0025; H04B 7/086
USPC ........................................................ 342/417
See application file for complete search history.

(56) References Cited

U.S. PATENT DOCUMENTS

| 6,091,361 | A | * | 7/2000 | Davis ........................ G01S 7/36 342/195 |
| 6,765,532 | B2 | | 7/2004 | Vaccaro et al. |
| 2003/0204380 | A1 | | 10/2003 | Dishman et al. |
| 2004/0113839 | A1 | | 6/2004 | Vaccaro et al. |
| 2006/0194544 | A1 | | 8/2006 | Struckman |
| 2010/0106440 | A1 | * | 4/2010 | Richmond ................ G01S 3/74 702/71 |
| 2012/0071102 | A1 | | 3/2012 | Palomar et al. |
| 2012/0249360 | A1 | | 10/2012 | Kanamoto |

(Continued)

OTHER PUBLICATIONS

International Search Report, PCT/US20/62854, 12 pages, dated Feb. 19, 2021.

*Primary Examiner* — Harry K Liu
(74) *Attorney, Agent, or Firm* — Finch & Maloney PLLC

(57) ABSTRACT

A method, system, and computer program are described for identifying the presence of narrowband signals within a wide instantaneous bandwidth by exploiting the spatial diversity of the received signals using an array aperture to provide detection capability. For example, the method includes receiving and channelizing digitized signals into signals with a narrow bandwidth of interest. The method further includes estimating covariance matrices associated with the signals, determining a set of Eigenvalues for the covariance matrices, and analyzing each Eigenvalue to determine a rank change estimate. The method further includes identifying one or more of the signals that have a positive rank change estimate, computing a beam forming weight and direction estimate for each signal that has a positive rank change estimate, and outputting an indication of the signals that have a positive rank change estimate including one or more of fine timing information, the beamforming weights, and the direction estimate.

20 Claims, 11 Drawing Sheets

(56) References Cited

U.S. PATENT DOCUMENTS

| | | | |
|---|---|---|---|
| 2013/0252568 A1* | 9/2013 | Woodsum | H04B 1/10 |
| | | | 455/296 |
| 2016/0365100 A1* | 12/2016 | Helwani | G10L 21/0232 |
| 2018/0173676 A1* | 6/2018 | Tsai | G06F 17/16 |
| 2019/0274127 A1* | 9/2019 | Nammi | H04B 7/088 |
| 2020/0195325 A1* | 6/2020 | Yuan | H04B 7/0617 |

* cited by examiner

SPATIAL ENERGY RANK DETECTOR AND HIGH-SPEED ALARM

FIELD OF THE DISCLOSURE

The present disclosure relates to blind signal detection and channelized signal detection across a frequency spectrum, and more particularly to blind signal detection and channelized signal detection across a frequency spectrum in the presence of co-channel interference.

BACKGROUND

The purpose of a spatial acquisition process is to detect signals in a cluttered radio frequency (RF) environment and to provide an alarm if a signal of interest is detected. The ability to ascertain the presence of a new signal is particularly important in applications such as military and law enforcement, so as to quickly identify the signal type and the location of its transmitter. Finding signals and identifying them is particularly troublesome when listening across a wide range of frequencies, so called wideband signal acquisition. In addition to the problem of discerning a signal from background environment noise, one is faced with the problem of detecting signals occupying the same frequency band, so called co-channel interferers. Many current energy detection algorithms use a single channel for input which prevents the detection of signals which are received at lower signal power than a dominant interferer.

BRIEF DESCRIPTION OF THE DRAWINGS

Various aspects of at least one example are discussed below with reference to the accompanying figures, which are not intended to be drawn to scale. The figures are included to provide an illustration and a further understanding of the various aspects and examples and are incorporated in and constitute a part of this specification but are not intended to limit the scope of the disclosure. The drawings, together with the remainder of the specification, serve to explain principles and operations of the described and claimed aspects and examples. For purposes of clarity, not every component may be labeled in every figure.

DETAILED DESCRIPTION

Figure 1:
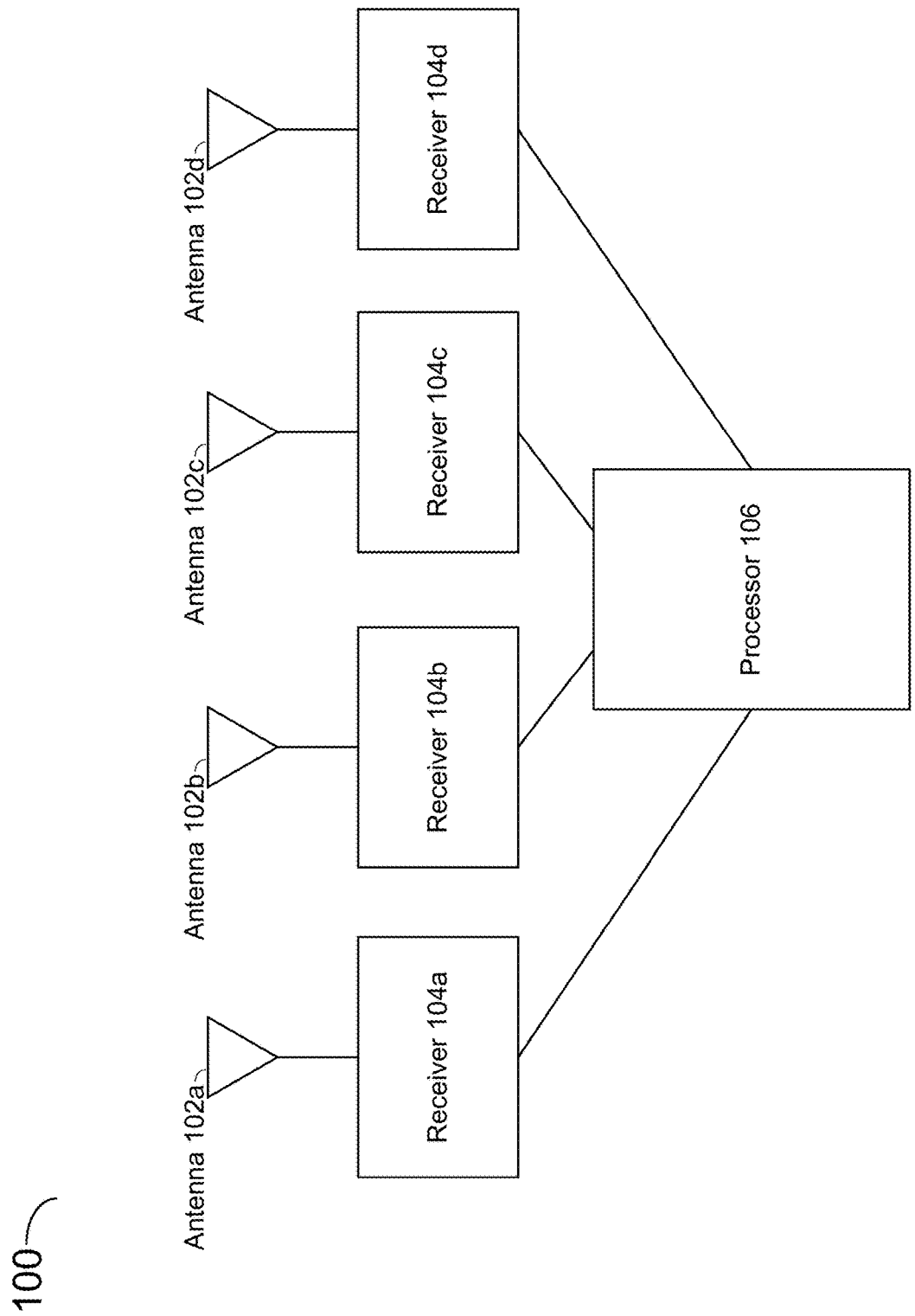
FIG. 1 depicts a block diagram of a spatial detection architecture, in accordance with an embodiment of the present disclosure.

A system, method, and computer program product are described herein for detecting the presence of a narrowband signal amongst a wider bandwidth. For example, in one such embodiment the system includes an antenna array having a plurality of antenna elements; a plurality of receivers, each of the plurality of receivers being operably coupled to one of the plurality of antenna elements and configured to receive a wideband signal collected over a period of time from an associated antenna element and output one of a plurality of output signals; and a processor operably coupled to the plurality of receivers. According to some such embodiments, the processor is programmed or otherwise configured to receive the plurality of output signals, and filter each of the plurality of output signals to a narrow bandwidth of interest to produce a plurality of filtered signals. Then, for each of the plurality of filtered signals, estimate a plurality of covariance matrices for each of a plurality of subsets of the period of time, the processor is further configured to determine a set of Eigenvalue for each of the plurality of covariance matrices, analyze each of the set of Eigenvalues to determine a rank change estimate for each of the plurality of filtered signals, identify each of the plurality of filtered signals associated with a positive rank change estimate, compute a set of beamforming weights and direction estimate for each of the plurality of filtered signals associated with a positive rank change estimate, and output an indication of each of the plurality of filtered signals associated with a positive rank change estimate. The indication includes the beam forming weight, a fine tuning estimate, and the direction estimate for each of the plurality of filtered signals associated with a positive rank change estimate. Numerous variations and embodiments will be appreciated.

General Overview

Spatial detection is important when trying to identify a specific signal from a group of signals all operating in the same frequency band. However, in various applications such as military-based signal monitoring, the strongest signal is typically not a signal of interest. For example, in an airborne signal monitoring platform, the signal of interest may be a ground-based signal that is not intended for broadcast into the air. In the air, the strongest signals are typically commercial television and radio signals which drown out the signal of interest. Using spectrum analysis, you would not see the signal of interest under the strong signals. However, spatial detection systems can help focus on a narrow beam to detect one or more signals of interest and produce a detection event upon identification of a potential signal of interest. For example, a detection event can include one or more events that described a particular scenario such as identifying a frequency and time pair at which a signal became detected. Conversely, a detection event can include a time indication when a previously identified signal of interest goes away, e.g., when the signal stops broadcasting. In certain implementations, detection events can be presented as software messages or other similar electronic indications or notifications. Unfortunately, traditional spatial detection systems have various drawbacks. For example, the computational complexities of the algorithm do not scale well to embedded systems with typical Central Processing Units (CPUs) as the primary computation engine. Based upon performance limitations, these systems use subspace tracking techniques, which, by definition, do not include the full space of statistical measurements required for highly accurate real-time spatial detection. Furthermore, these systems do not scale well as the number of input channels increases, which typically creates a bottleneck at the CPU and results in delayed processing of real-time spatial detection information.

Thus, systems, methods and processes are provided herein for high-speed spatial detection and alarm using full space tracking techniques that scale quickly for larger antenna arrays having more antenna elements. In one such example embodiment of the present disclosure, multiple coherent time domain IQ streams are input into a spatial energy detector that will be explained in turn, and the system computes a parallel set of Eigenvalues for each time lag using an iterative QR algorithm tailored for parallel processing on a General-Purpose Graphics Processing Unit (GPGPU). These Eigenvalues are then analyzed to find positive rank change estimates using a thresholding algorithm. If a positive rank change estimate is identified, then the signal is declared detected.

In another example embodiment of the present disclosure, a Spatial High-Speed Alarm (HSA) channelizes multiple coherent time domain IQ streams into a set of narrowband streams for further processing. In some such cases, covariance matrices are generated for each time lag of each channel. These covariance matrices are then decomposed into a set of N Eigenvalues. The full Eigen space for each time lag of each channel is then analyzed using a rank estimation algorithm.

In certain examples, at frequencies and time lags where a positive rank change estimate is identified, a set of beamforming weights are computed and applied for subsequent threshold detection and fine time estimation of the signal. In some cases, time coincident detections across neighboring channels are clustered to identify a signal with bandwidth higher than the original channelization. The channelization, covariance matrix generation, Eigenvalue and vector decomposition, and beamforming weight application are all done in parallel using one or more GPGPUs.

In certain embodiments, a system as variously described herein is designed for "wideband" signals which occupy the full bandwidth of the processed detection stream. In such an example, the processing dimensions of the wideband signals can be represented by are Eigen space across time. In certain other embodiments, a system as variously described herein can be designed for a plurality of "narrowband" signals which occupy a small subset of the processed bandwidth. This adds another dimension of signal identification during processing, namely channelized frequency, such that the processing dimensions of the narrowband signals can be represented by frequency divided by Eigen space across time, thereby providing additional information related to narrowband signals during signal processing.

In certain embodiments of the present disclosure, GPGPUs are leveraged to act as parallel Eigen solvers. The ability to perform millions of Eigenvalue and Eigenvector (EVD) decompositions in parallel enables a number of useful capabilities including Frequency Domain Spatial Rank Detection, Time Domain Spatial Rank Detection, Agile Feature Discrimination, and Direction-Finding Service. The efficiencies gained by parallelizing according to some such embodiments allow the algorithm to process significantly higher bandwidths than linear based processing algorithms.

In certain examples as described herein, one implementation for the Eigen solver can be to solve for Eigenvalues and optionally Eigenvectors for a covariance matrix Rxx. In certain embodiments, Rxx is an N×N Hermitian matrix, built from N distinct yet coherent input complex IQ waveforms. However, it should be noted that Hermitian matrices are provided by way of example only. There are a number of methods to solve for Eigenvalues and vectors and for N>3, most are iterative in nature.

In certain embodiments as described herein, a QR algorithm is used such that the QR decomposition of a matrix A finds an orthogonal matrix Q and an upper right triangle matrix R such that A=QR. It can be shown that the matrix RQ has the same Eigenvalues and vectors as A. Successive applications reduce all elements of the matrix except for the diagonal. A matrix that is diagonal has the same Eigenvalues as the elements along the diagonal. The product of the transformation matrices Q will produce the Eigenvectors.

According to an embodiment, the QR algorithm generally includes the input matrix to be in upper Hessenberg form. A fortunate fact about Hermitian matrices is that their upper Hessenberg form is a real tridiagonal. There, it reduces the problem from the complex domain to the real domain. By transitioning from the complex to real domain, the techniques as described herein reduce the number of arithmetic steps to get a set of Eigenvalues as functions in the complex domain are more computationally demanding that in the real domain. As such, the QR algorithm according to such embodiments reduces the problem from N×N to N+(N−1) and reduces the number of iterations and computational cost further. In some cases, the system applies Wilkinson shifts along the diagonal at each iteration and deflates the problem as $b(m-1)$ approaches zero, wherein $b(m-1)$ represents the off-diagonal terms of a symmetric tridiagonal matrix resulting from the iteratively applied shifts.

As established in existing spatial detection techniques, several assumptions can be made prior to signal processing. For example, it is generally assumed that time domain signals from unique emitters are uncorrelated and that each signal emitter's direction of arrival induces a unique steering vector. As described herein, the covariance matrix Eigenvalue spectrum can include a number of Eigenvalues that are sufficiently separated from Eigenvalues representing noise. Such a separation can allow for establishment of the number of signals being transmitted during a signal collection interval. As further described herein, the number of distinct Eigenvalues, or the rank of the covariance matrix, is equal to the number of signals detected during the collection interval. Additionally, the Eigenvectors that correspond to the Eigenvalues can form a spanning set that corresponds to the subspace of the Eigenvectors for each detected signal. As further described herein, direction of arrival information can be determined or otherwise calculated using standard direction finding techniques. In some implementations, changes in the detected signal subspaces over time can allow for the tracking of signals, as well as to provide a clean copy of new signals including, for example, a copy of a signal stream within any background interference removed. Thus, the techniques and processes as described herein can provide for detection of multiple signals present within the same time and frequency block, the results having an increased resolution capacity.

System Architecture

Referring now to FIG. 1, the architecture of a spatial subspace detector 100 is illustrated in which incoming signals are detected by an array of antennas 102a-102d. In an example, each antenna can be configured to define a wideband spatial channel. For example, a wideband spatial channel can include a frequency bandwidth of about 100 MHz. In other examples, the wideband spatial channel can include a frequency bandwidth of about 50 MHz to about 150 MHz. The output of each the antennas 102a-102d is coupled to a receiver 104a-104d. In certain implementations, an analog to digital converter (ADC) can be coupled between each antenna 102a-102d and an associated receiver 104a-104d. The ADCs can be configured to convert analog RF signals received by one or more antennas 102a-102d into a digital signal for processing by one of the receivers 104a-104d. In some examples, each of receivers 104a-104d can include an integrated ADC configured to convert a received analog signal to a digital signal for further processing. Additionally or alternatively, each of the receivers 104a-104d can be configured to perform one or more of filtering, down conversion, amplification, and other similar signal processing to received signals from the antennas 102a-102d. In some examples, the detector 100 can include one or more additional circuit components coupled between the antennas 102a-102d and the receivers 104a-104d, the one or more additional circuit components configured to perform signal processing such as filtering, down conversion, amplification, and other similar signal processing.

In certain implementations, each of the receivers 104a-104d are configured to be coherent in time and frequency and each antenna 102a-102d is installed and positioned at a specific location to prioritize spatial diversity at particular frequencies of interest. In one example, the processor 106 can be designed to include both a CPU and a GPGPU for signal processing functionality.

It should be noted that four antennas 102a-102d are shown by way of example only. The actual number of antenna elements used can be based upon the range of frequencies being monitored. For example, for VHF and ultra-high frequency (UHF) systems, the antenna array can include eight antenna elements, each connected to one of eight receivers. The antenna elements can further be positioned about a meter apart from each other and angled to prioritize the spatial diversity between each of the antennas.

Methodology and Process Flow

Figure 2:
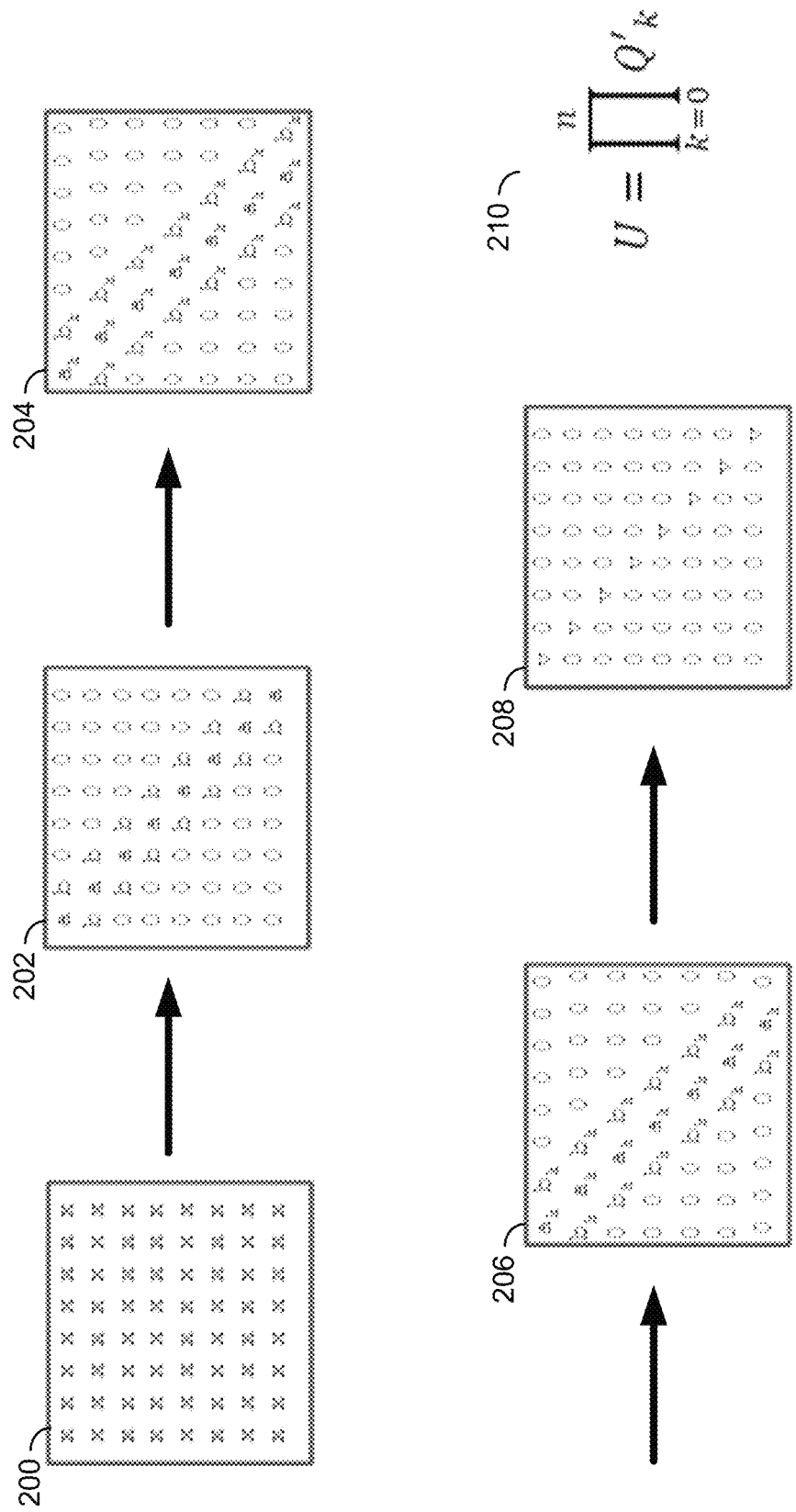
FIG. 2 depicts generating one or more Eigenvalues and/or Eigenvectors using a QR algorithm, in accordance with an embodiment of the present disclosure.

Referring to FIG. 2, the use of a QR algorithm according to the principles of the present disclosure is shown. In numerical linear algebra, the QR algorithm is an Eigenvalue algorithm, that is, a procedure to calculate the Eigenvalues and Eigenvectors of a particular matrix. Essentially, the QR algorithm includes a QR decomposition, writing the matrix as a product of an orthogonal matrix and an upper triangular matrix, multiplying the factors in reverse order and iterating.

For example, as shown in FIG. 2, a Hermitian matrix 200, referred to herein as $R_{xx}$, can be built from N distinct yet coherent input complex IQ waveforms representing, for example, wideband signals received from antenna elements as shown in FIG. 1. The matrix $R_{xx}$ can be converted into Hessenberg form, resulting in matrix 202, wherein $[A,Q] = hess(R_{xx})$. In linear algebra, a Hessenberg matrix represents a square matrix having specific arrangements of zero-value entries. For example, an upper Hessenberg matrix has zero-value entries below the first subdiagonal, and a lower Hessenberg matrix has zero-value entries above the first superdiagonal.

Referring back to FIG. 2, successive QR algorithm iterations can be applied to matrix 202 to reduce $b_m$ 8 such that $Q_k R_k = qr(A_k - diag(mu)); A_k = R_k Q_k + mu$ as shown in matrix 204. In certain embodiments, as $b_m$ approaches 0, the problem is deflated to a smaller matrix, where $Q_k R_k = qr(A_k - diag(mu)); A_k = R_k Q_k + mu$, as is shown, for example, in matrix 206. The sub-diagonals can be removed and replaced with the matrix Eigenvalues remaining in the center diagonal, such that $Q_k R_k = qr(A_k - diag(mu)); A_k = R_k Q_k + mu$, as shown in matrix 208. The Eigenvectors U can be computed by multiplying each transformation matrix Q by equation 210. However, in certain examples, the Eigenvectors U can be omitted if not required.

Figure 3:
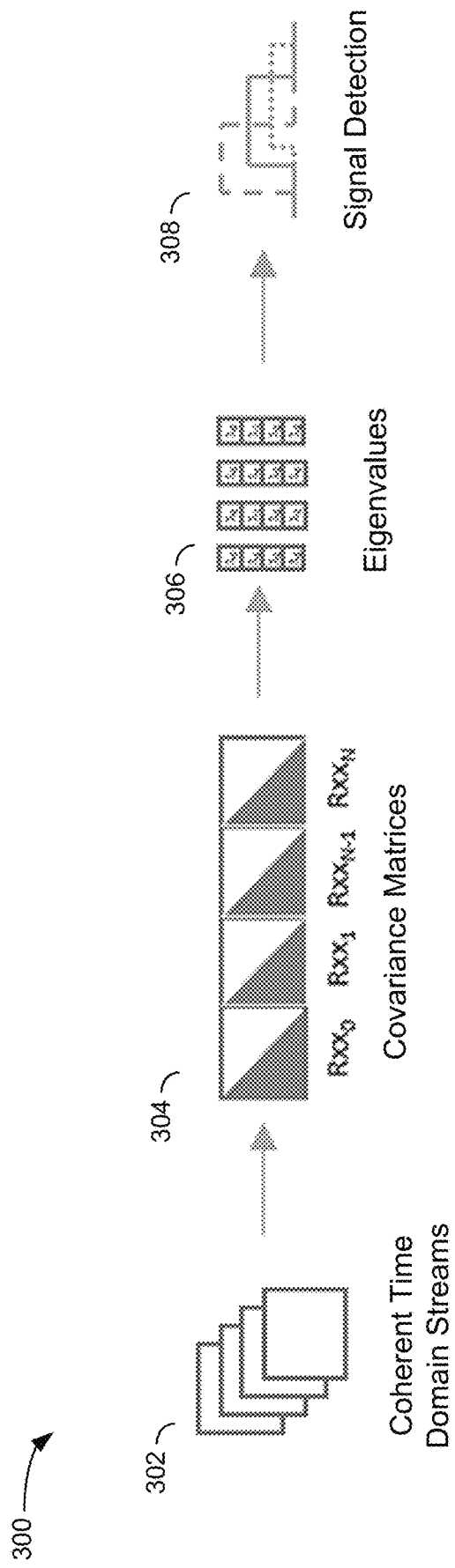
FIG. 3 depicts a diagram of a data flow for spatial signal detection, in accordance with an embodiment of the present disclosure.

Referring to FIG. 3, a diagram of a sample process 300 for using spatial detection to determine one or more signals of interest in a single frequency band (e.g., a 1 MHz band) selected from a wideband set of signals. As shown, one or more receivers/digitizers (e.g., receivers 104a-140d as shown in FIG. 1 and described above) can be configured to receive coherent time domain streams 302 from a plurality of antenna elements (e.g., antennas 102a-102d as shown in FIG. 1 and described above). In this context, coherent represents sampling at exactly the same time and frequency for each of multiple data streams such that multiple channels are sampled using a common clock. These streams can be transferred to a processor (e.g., processor 106 as shown in FIG. 1 and described above) as input for a first algorithm which computes statistical estimates in parallel to provide time delayed covariance matrices 304. In certain embodiments, the processor can iteratively run a second algorithm, such as a QR algorithmic technique, in parallel for each of the covariance matrices 304 to produce a set of time delayed Eigenvalues 306. From these Eigenvalues 306, the processor can look for changes over time to see when a signal arrived, and later went away, for use in signal detection 308 as described in greater detail below in the discussion of FIG. 5.

Figure 4:
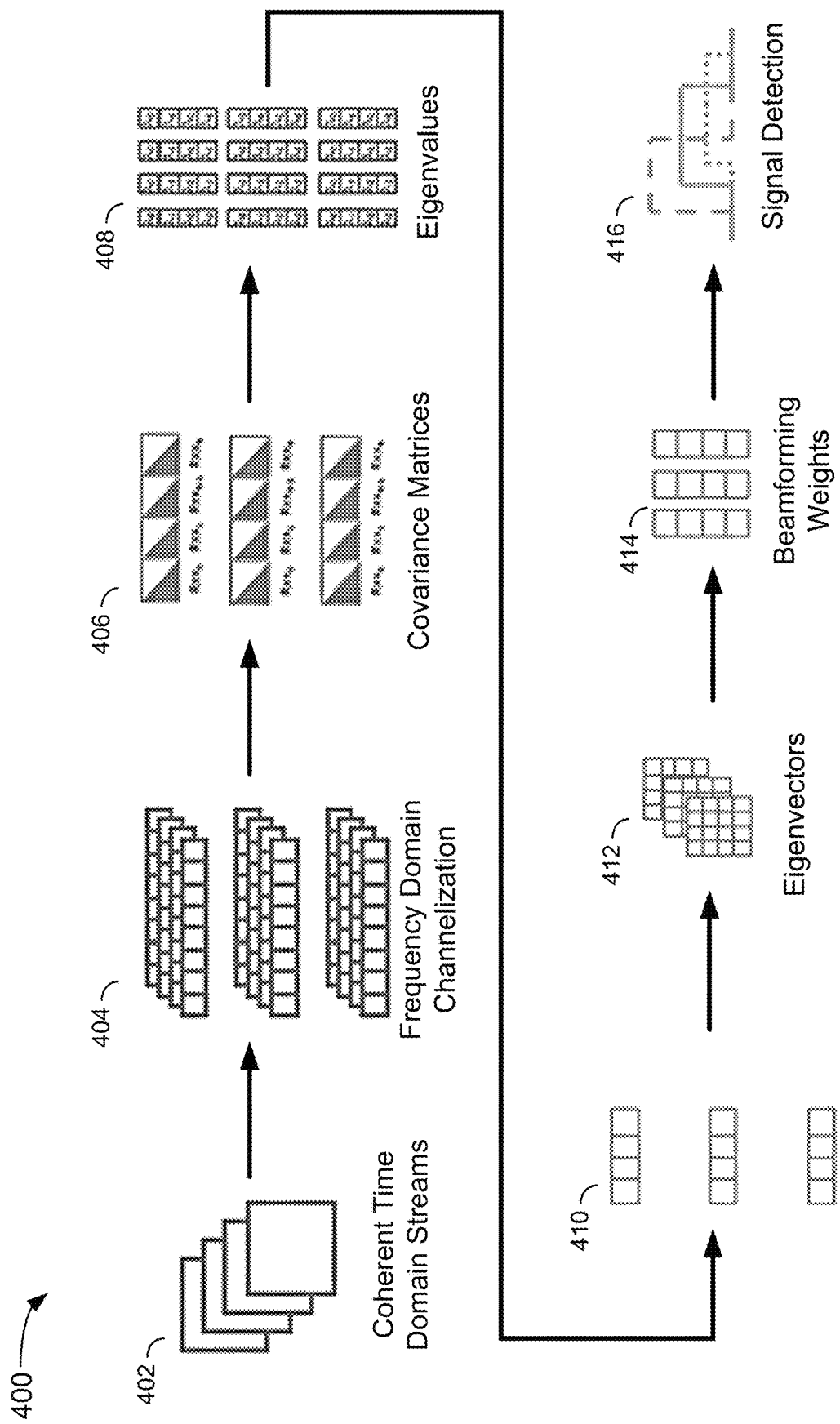
FIG. 4 depicts a more detailed diagram of a data flow for spatial signal detection, in accordance with an embodiment of the present disclosure.

As noted above, process 300 is directed to identifying one or more signals of interest from a single frequency band selected from a wideband set of signals. However, in some examples such as monitoring enemy radio transmissions in a military environment, the specific frequency band to monitor may be unknown and/or may change regularly as the radio transmissions change frequencies. Additionally, signals of interest may span multiple frequency bands and, as such, may not be accurately identified when only monitoring a single frequency band or channel. FIG. 4 illustrates a sample process 400 for monitoring multiple frequency bands or channels simultaneously for signals of interest. It should be noted that process 400 as shown in FIG. 4 is explained in greater detail below in the discussion of FIG. 5 as well.

Referring to FIG. 4, a first portion process 400 is shown. More specifically, one or more receivers/digitizers as described herein can receive coherent time domain streams 402 from a plurality of antenna elements. As described in this example, coherent represents sampling at exactly the same time and frequency. A processor can receive the coherent time domain streams and filter the streams to channelize the streams into multiple frequency domain channels or subchannels 404. For example, the processor can access an analysis filter bank to separate the time domain stream into a number of frequency separated subchannels, each of which contains baseband data at a reduced sample rate. Thus, as described herein, channelization represents breaking up a wider frequency spectrum into subchannels, where these subchannels are run through similar algorithms as in the first embodiment. In this embodiment, there are multiple frequencies over time.

As further shown in FIG. 4, the processor can input these channelized frequency subchannels 404 into another algorithm where the processor computes statistical estimates in parallel. Based upon these computed statistical estimates, the processor can determine a set of time delayed covariance matrices 406 for each of the channelized frequency subchannels 404. In certain embodiments, the processor can iteratively implement another algorithm such as a QR algorithmic technique in parallel to produce a set of time delayed Eigenvalues 408 from this data. For example, the set of Eigenvalues can include a number of Eigenvalues equal to the number of antenna elements included in the antenna array. In certain implementations, an antenna array having eight antenna elements will produce 8×8 covariance matrices. When calculating the Eigenvalues as described herein, the QR algorithm will produce a set of eight associated Eigenvalues.

As further shown in FIG. 4, process 400 can continue with the processor processing the Eigenvalues 408 using a parallel time-delayed rank change estimation to determine one or more rank change estimates 410 for each of the Eigenvalues. The processor can further implement an iterative QR algorithmic technique to compute a set of Eigenvectors 412 for each of the rank change estimates 410. In certain implementations, the processor can compute the Eigenvectors 412 in parallel for each of the rank change estimates 410 as each rank change estimate is an independent value that is unrelated to any other rank change estimate. Similarly, the Eigenvector computation process is an independent process that is not dependent upon any other processes or variables.

To continue the above example, as noted, a set of eight antenna elements in an antenna array will produce 8×8 covariance matrices. In such an example, the associated set of Eigenvalues will include eight Eigenvalues. When computing the set of Eigenvectors based upon the eight Eigenvalues, the resulting set of Eigenvectors will produce another 8×8 matrix. As such, using the techniques as described herein, each covariance matrix will be N×N in size, each set of Eigenvalues will include N values, and each set of Eigenvectors can be represented as an N×N matrix, wherein N is the number of antenna elements in an antenna array that is receiving the signal of interest.

Referring back to FIG. 4, the processor can determine additional information based upon the set of Eigenvectors 412 such as beamforming weights 414 when more than one signal is present. This separates out smaller and/or weaker signals that might be hidden by co-channel interference. As such, the processor can determine and identify one or more signals of interest that may be included in the smaller and/or weaker signals in the originally received wideband coherent time domain streams 402. Additional details related to the determining and identifying signals of interest is provided in the discussion of FIG. 5 below. In some embodiments, the co-channel interfere may be benign (like a broadband TV signal) or more intentional such as in a jamming/blinding scenario. In certain examples, detection of these hidden signals provides for decoding of communication signals, or the like, in the presence of co-channel interference.

In one example, an antenna array including a plurality of antennas is mounted on an airborne vehicle. As the airborne vehicle travels, it can pass though co-channel interference. In such an example, signals of interest can be received in conjunction with interfering signals that are received at higher power, resulting in a low probability of detection of the signal of interest if processed using single-channel spectral change features alone. The methodology and techniques as described herein provide for the detection of smaller, weaker and/or hidden signals from the ground (e.g., a tactical radio) which would otherwise be undetectable due to the co-channel interference. In some cases, based upon further analysis of the angle of arrival of the signals (as determined, for example, based upon the spatial diversity and positioning of antenna elements in the antenna array), the detector can use geo-spatial analysis to determine from which direction the signal came.

Figure 5:
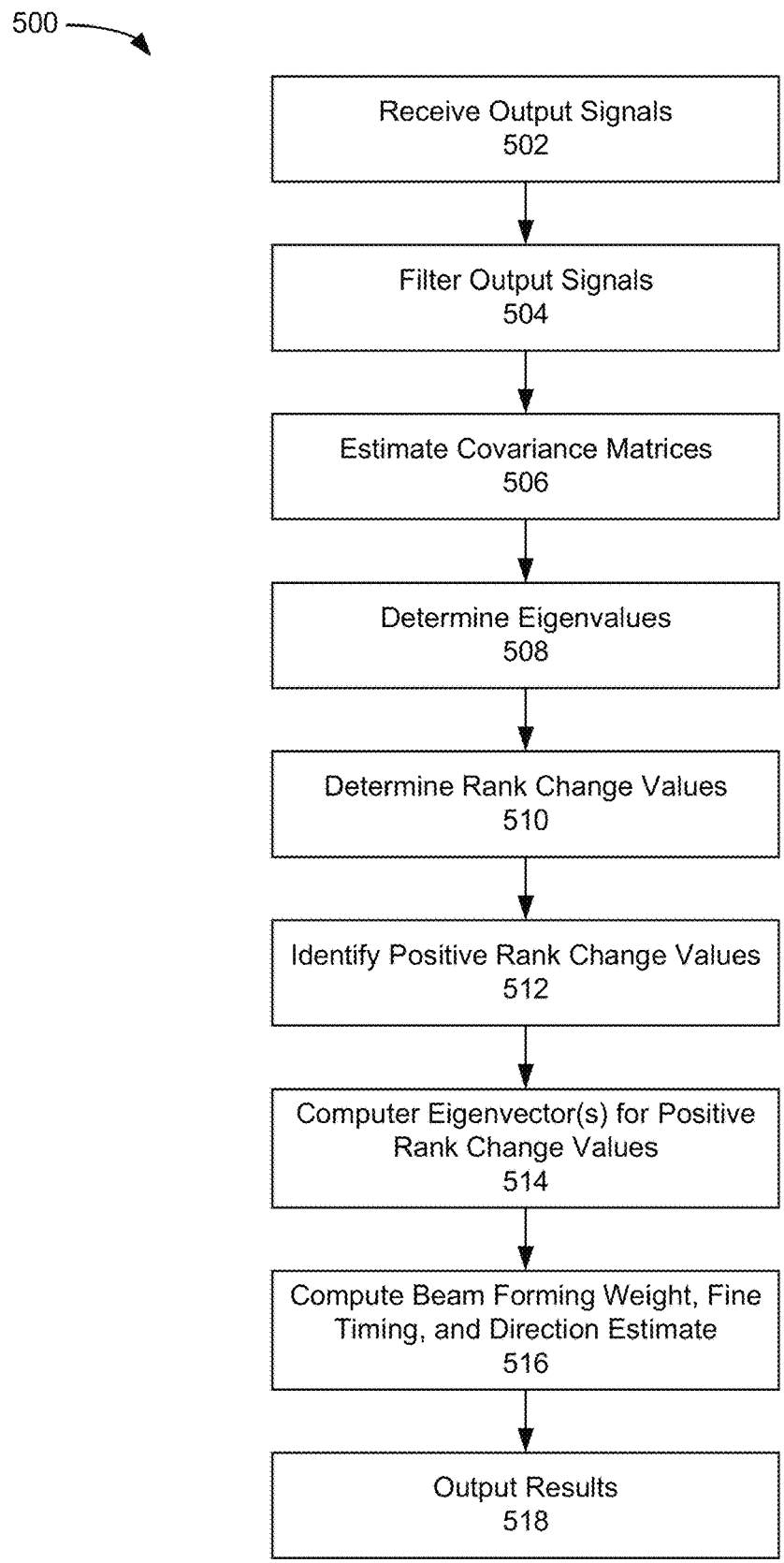
FIG. 5 depicts a flowchart for carrying out spatial signal detection, in accordance with an embodiment of the present disclosure.

Referring to FIG. 5, a process flow of a more detailed process 500 for detecting signals of interest and providing an indication of such signals is illustrated. As noted above, the spatial HSA as described herein detects the presence of narrowband signals across a wide instantaneous frequency bandwidth of an antenna array. The algorithms as described herein exploit the spatial diversity of the received signals to provide detection capability in a negative signal-to-interference-plus-noise-ratio (SINR) environment. A processor such as processor 106 can implement process 500 as shown in FIG. 5.

As shown in FIG. 5. the processor can initially receive 502 the output signals as digitized coherent wideband streams from a set of receivers (e.g., receivers 104a-104d as shown in FIG. 1 and described above). The digitized coherent wideband streams are first filtered 504 by, for example, frequency channelizing the output signals to a narrow bandwidth more related to the signals of interest. In certain examples, the wideband streams are channelized into frequency bins having the same frequency width. For example, for an HF system, the frequency bins can be about 3-16 kHz wide. For a VHF/UHF system, the frequency bins can be about 25 kHz wide. It should be noted, however, that these frequency bin widths are provided by way of example only. In some embodiments, the size of the frequency bins can be instantaneously driven by the bandwidth being monitored and an expected frequency of any signals of interest.

As further shown in FIG. 5, the processor can compute 506 covariance matrices estimates for each channelized frequency bin at a time resolution of the narrowband bandwidth. One important aspect of the present disclosure is the computation of the covariance matrices for each frequency bin is performed in parallel for each dimension of input data (e.g., for each receiver element, for each frequency bin across the receivers, and for each discrete time element). Thus, the processor can compute 506 the covariance matrices for the frequency bins for each of the receivers across each discrete time element in a substantially simultaneous manner.

For example, the processor can compute a covariance matrix at time X for each of the antenna elements. The processor can further compute a covariance matrix at time X+1 for each of the antenna elements. Each of these discrete time elements are independent and, as such, can be calculated in parallel.

Once the covariance matrices are computed, the processor can determine 508 a full Eigenvalue decomposition for each covariance matrix, resulting in a set of Eigenvalues for the covariance matrices. For example, the processor can determine the Eigenvalues using parallel QR algorithm iterations as applied to each covariance matrix. In some examples, the Eigenvalues can be used to spatially map uncorrelated and unique signals to a covariance Eigenvalue spectrum. For example, these Eigenvalues can be coupled together and used as inputs by the processor to compute a rank change estimate which is representative of how many discretely identifiable signals are present in that wideband stream for a given time (e.g., time X or time X+1). In an example, if you have eight antennas (and eight receivers) and there are two signals of interest on a given frequency at any given time (coming from different directions), the resulting set of eight Eigenvalues would have two Eigenvalues that have significantly higher values that the remaining six (e.g., more than 50% higher). The Eigenvalue set size can also provide an indication of how many signals of interest you can detect at the same time. Additionally, the set of Eigenvalues can be analyzed to determine additional information about the wideband streams such as SINR and signal-to-noise ratio (SNR).

As further shown in FIG. 5, the processor can analyze the set of Eigenvalues across the time lags for each channelized frequency stream to determine 510 rank change estimates. Based upon this information, the processor can also determine agile signals having a short burst duration and that are quickly hopping across frequencies. For example, if a rank change estimate increases over a time period, then it is likely that a new signal is present over that particular time period at a certain frequency associated with that rank change estimate. Conversely, if a rank change estimate decreases over a time period, then it is likely that a signal went away during that time period. In the agile signal example, the processor can be configured to determine additional information based upon the associated Eigenvalues. For example, during a particular burst, a rank change estimate can go from n to n+1 for a period of time. During that period of time, it is likely that a new signal is present as the rank change estimate has increased. After the period of time, the rank change estimate can return to n. At that point, it is likely that the signal went away as indicated by the decrease in the rank change estimate. Based upon the time between the increase and decrease in rank change estimates, the processor can determine various information. For example, the processor can determine how long was the signal active. The processor can also analyze additional information such a beamforming weights as described below to determine additional information such as what where the modulation parameters, where did the signal come from, and other similar information. In some implementations, the processor can use beamforming weights to provide a clean copy of the target signal that is free from interference. The clean copy can include a single channel stream containing the target signal that can be further processes and analyzed using, for example, modulation analysis, audio analysis, and other similar signal analyzing techniques.

In order to accurately identify additional information about signals of interest, the processor can identify 512 one or more time lags with a positive rank change estimate. The processor can then perform further processing and analysis of all such identified time lags. For example, the periods of times where the positive rank change estimates were observed can be further analyzed. In some examples, any identified Eigenvalues that change over time can be converted to discrete time values that indicate or represent signal changes. The processor can limit further analysis to those discrete time values associated with changing Eigenvalues to reduce the amount of search and further analysis. The processor can then compute 514 one or more Eigenvector sets for each covariance matrix associated with a positive rank change estimate. For example, the processor can compute 514 a set of Eigenvectors at a time directly before and after the signal generation. More specifically, if the signal is detected at time X, the processor can compute 514 a set of Eigenvectors for the covariance matrix representing time X−1 and for the covariance matrix representing time X+1.

During the additional processing, the processor can compute 516 beamforming weights, fine timing, and direction-finding estimates based upon the set of Eigenvectors. These computations can be enabled via a parallel Eigenvector computation using, for example, QR algorithm iterations. The set of Eigenvectors immediately prior to the positive rank change estimate (e.g., from time X−1) can be used to whiten the covariance matrix immediately following the positive rank change estimate (e.g., at time X+1). A dominant Eigenvalue and its corresponding set of Eigenvectors for an associated covariance matrix can represent the beamforming weight estimate of the newly arrived signal. For example, a dominant or principle Eigenvector of a whitened covariance matrix can provide a copy weight for a signal of interest, nulling signals in the background covariance as represented by the X−1 covariance matrix estimate. Fine time estimates for the newly arrived signal can be computed after applying the beamforming weights. Finally, a direction-finding estimate can be computed from the set of Eigenvectors immediately prior to and following the positive rank change estimate. The difference between the two correlation surfaces reveals the angle of arrival direction estimate of the newly arrived signal. This information can be compared to, for example, a known database of angle of arrival measurements for a particular antenna array. In some additional embodiments, the processor can further use relative amplitude phase information for each antenna element at each frequency, as correlated against each Eigenvector, to compute the angle of arrival and thus the direction of the signal of interest.

As further shown in FIG. 5, the processor can output 518 the results of the spatial detection of one or more signals of interest as shown in process 500. For example, the processor can output an HSA notification identifying one or more signals of interest. The HSA notification can include, for example, additional information such as timing information, geospatial and directional information, signal duration information, frequency hopping information, and other similar information as detected and/or determined by the processor as described herein.

In certain examples, a signal of interest can be wider than the frequency band or bin being analyzed. In such an example, the signal of interest can be detected in adjacent frequency bins and indicated by Eigenvalues having similar or identical numerical values for those adjacent frequency bins. This similarity may provide an indication that the signals are actually pieces of the same signal that spans multiple frequency bins, and the adjacent bins can be clustered for further processing as shown, for example, in FIG. 5 and described above.

It should be noted that, as described herein, the QR algorithm is described as being used to generate the Eigenvalues and Eigenvectors by way of example only. Additional algorithms such as the Bisection Algorithm, the Jacobi Eigenvalue Algorithm, the Divide and Conquer Method Algorithm, and other similar algorithms intended to produce one or more of an Eigenvalue and Eigenvector for matrix data can be used.

Example Data

Figure 6:
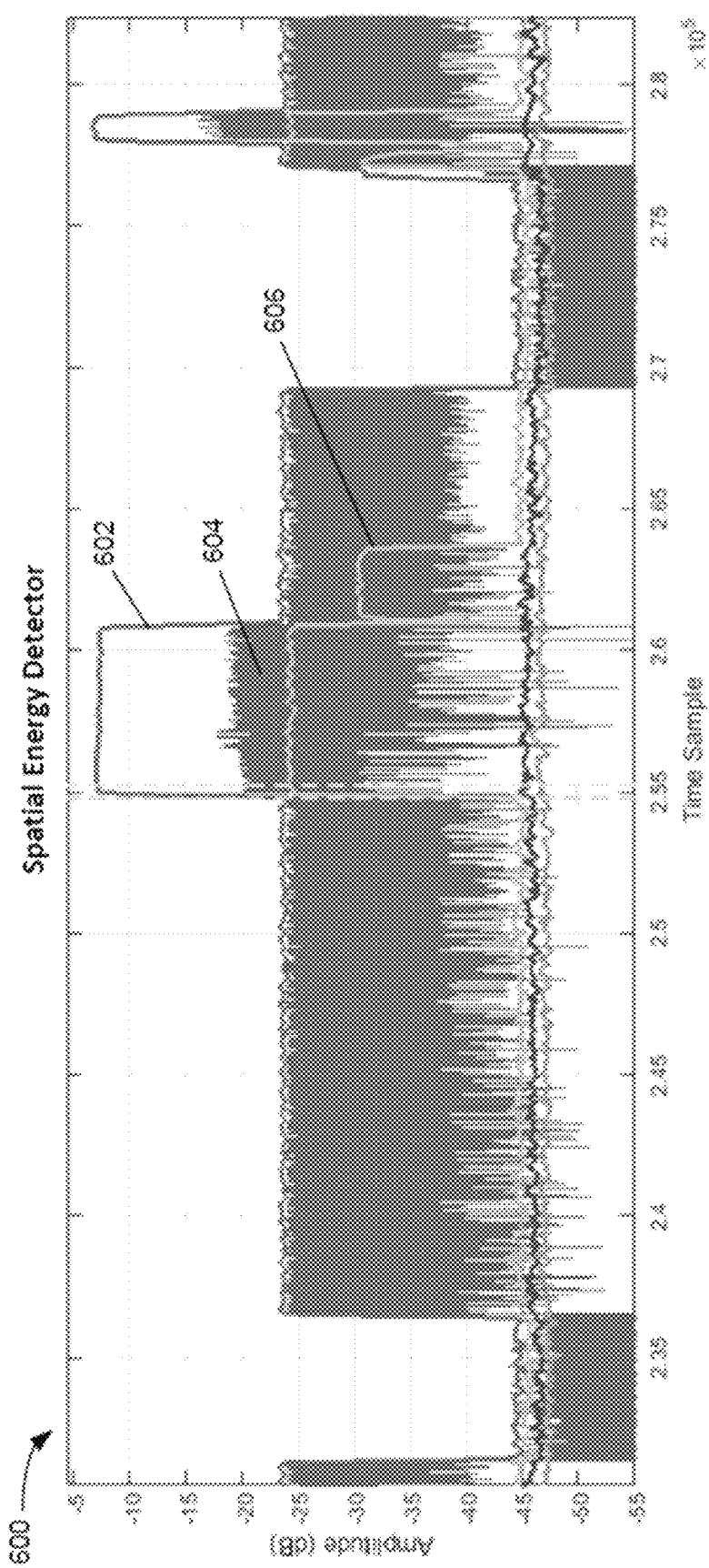
FIG. 6 depicts a spatial energy detector plot of signal amplitude over time, in accordance with an embodiment of the present disclosure.

Referring to FIG. 6, a spatial energy detector plot 600 of signal amplitude over time according to an embodiment of the present disclosure is shown. More specifically, 602 represents the received signal amplitude over time for a particular bandwidth such as, for example, a 1 MHz band as received by an antenna/receiver pair as described herein. One of the measured Eigenvalues is represented by 604 and indicates a large change that occurred over time. A signal that would ordinarily be lost or hidden is represented by 606. This "hidden" signal is uncovered or revealed at this frequency using, for example, process 500 as shown in FIG. 5 and described above.

Figure 7A:
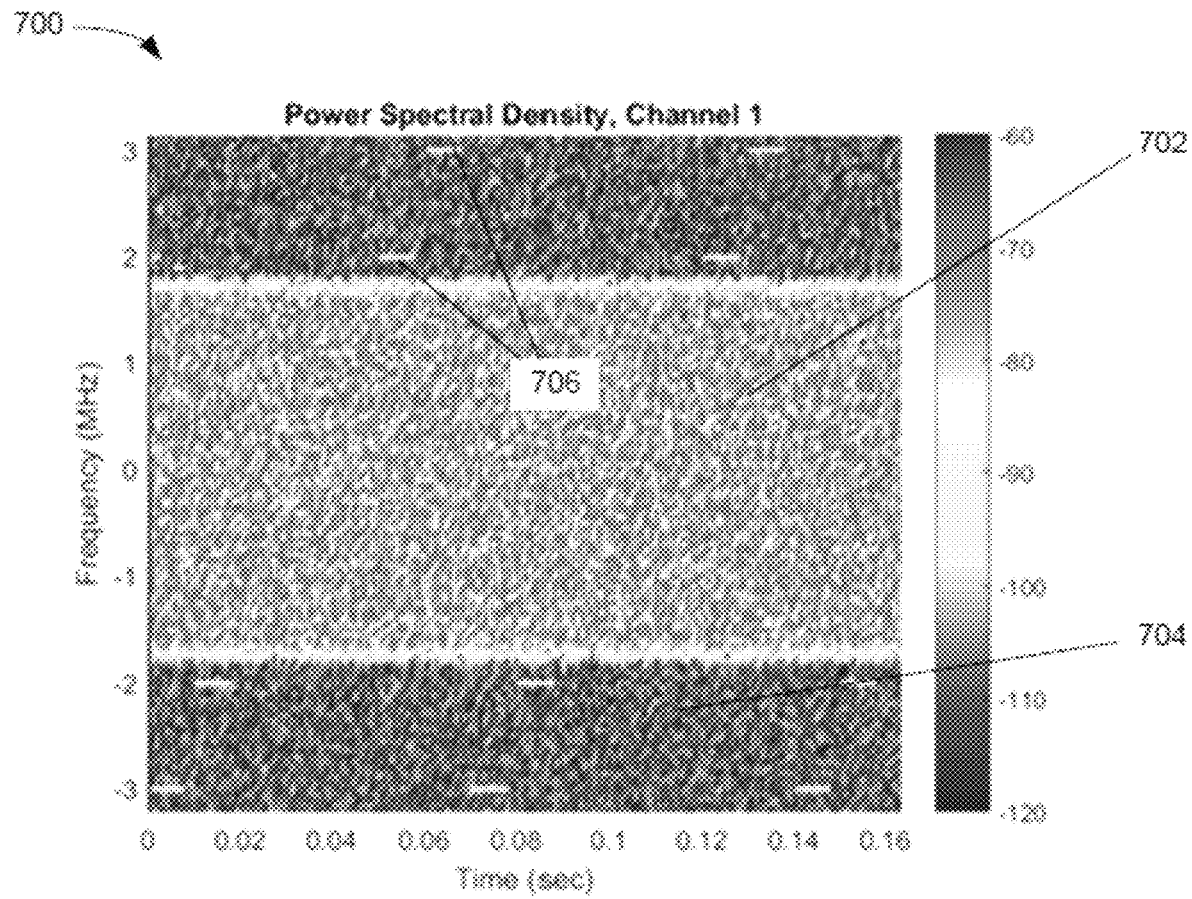
FIG. 7A depicts a plot of frequency over time showing power spectral density, in accordance with an embodiment of the present disclosure.

Referring to FIG. 7A-FIG. 7D, plots of frequency over time are shown according to the principles of the present disclosure. More specifically, FIG. 7A illustrates a plot 700 showing power spectral density such that band 702 represents an interferer-based band and band 704 represents a frequency band where no signal is present. As noted in the legend, weaker signals 706 show up against the background 704 but are not visible where the stronger interfere signal 702 is located.

Figure 7B:
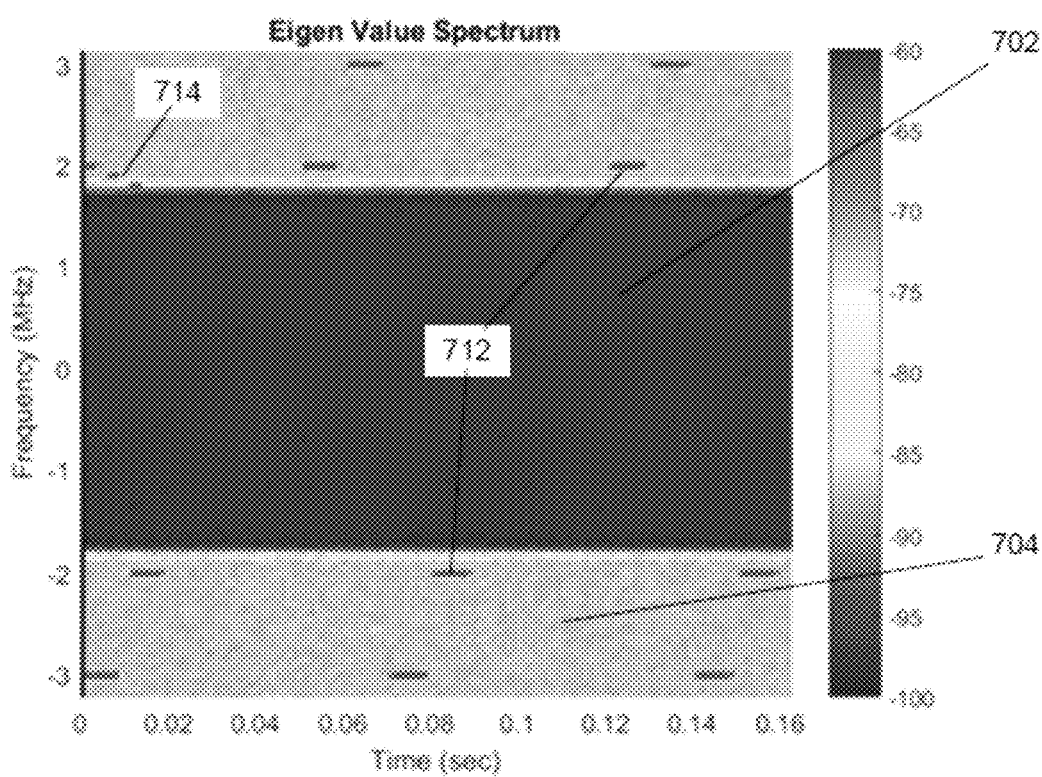
FIG. 7B depicts a plot of frequency over time showing the Eigenvalue spectrum, in accordance with an embodiment of the present disclosure.

FIG. 7B illustrates a plot 710 that includes one or more Eigenvalues showing that weaker signals 712, 714 are beginning to show up better in areas where there is no interferer such as band 704. However, the interferer signal band 702 is still obscuring the weaker signal in those areas.

Figure 7C:
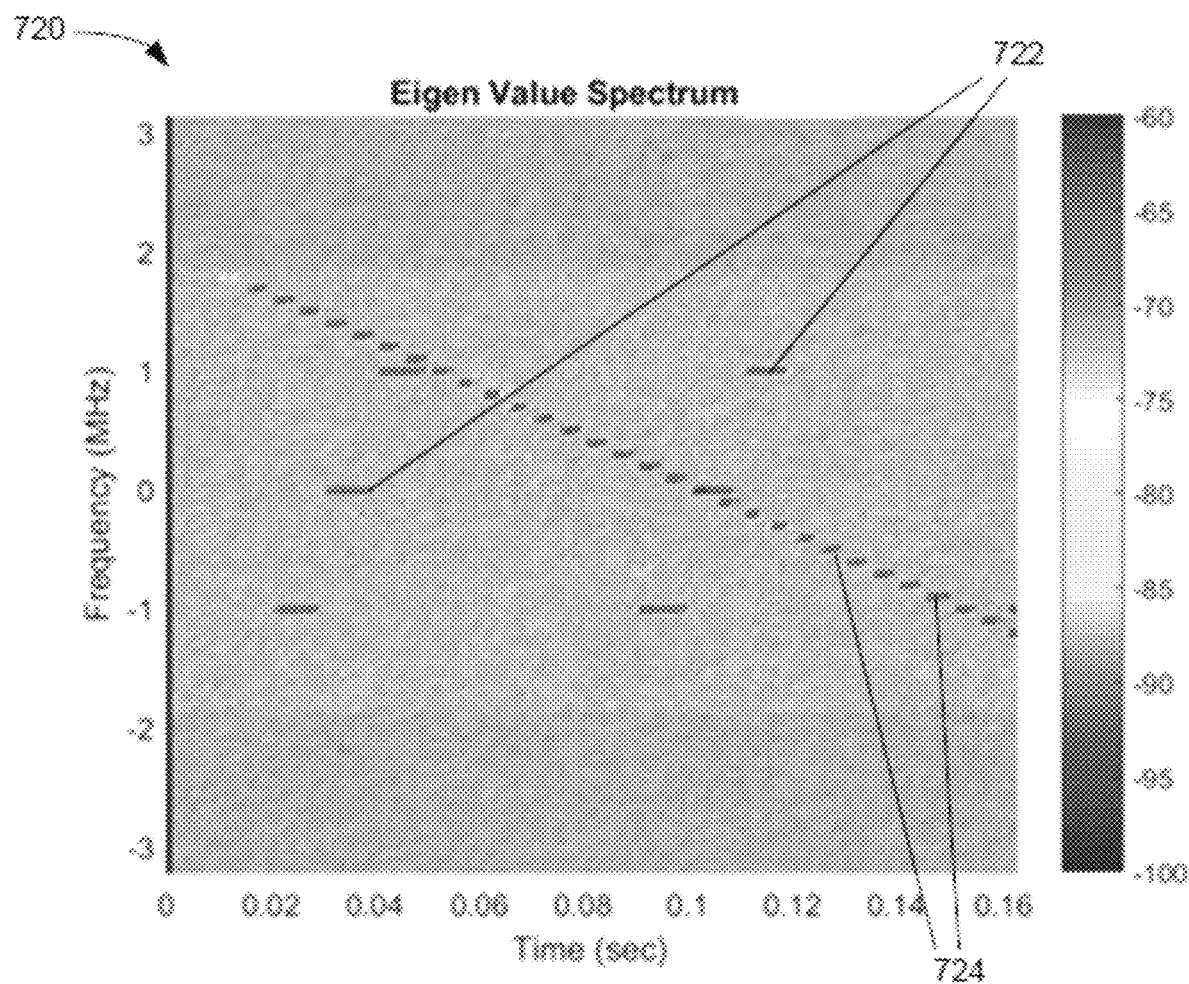
FIG. 7C depicts an alternate plot of frequency over time showing the Eigenvalue spectrum, in accordance with an embodiment of the present disclosure.

FIG. 7C illustrates a plot 720 that includes a first hidden signal 722 and a secondary hidden signal 724. According to the principles of the spatial detection techniques as described herein, detections can extend to n−1, where n is the number of antennas, and, as a result, can provide an indication of one or more previously hidden signals as is shown in FIG. 7C. Based upon detection of these hidden signals, a processor can activate an alarm such as the HSA as described above.

Figure 7D:
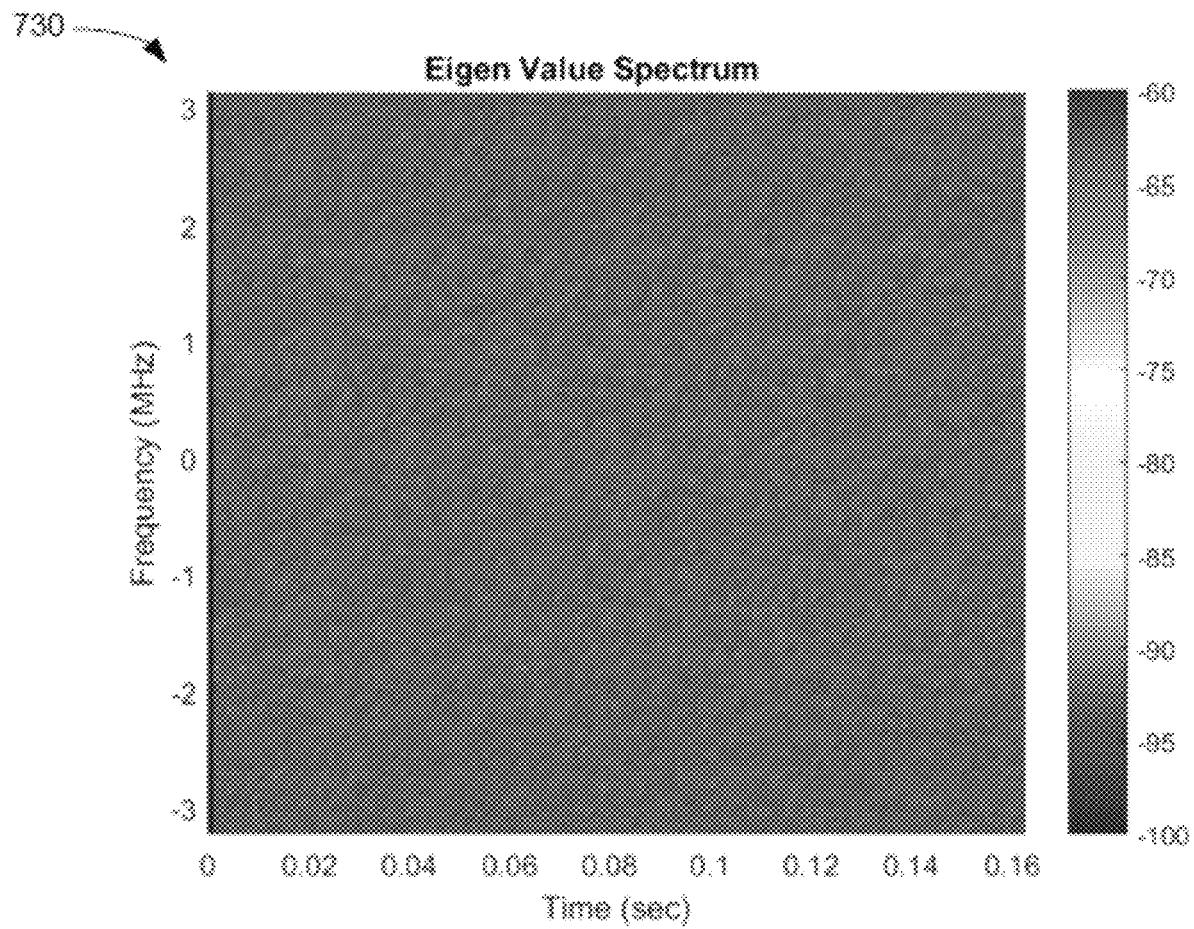
FIG. 7D depicts an alternate plot of frequency over time showing the Eigenvalue spectrum, in accordance with an embodiment of the present disclosure.

FIG. 7D represents a reference plot 730 including a one or more Eigenvalues showing no hidden signals.

In certain embodiments, the use of parallel computing methods provide for real-time processing of data. In such examples, there is no need to store the data in memory for an extended period of time prior to off-line processing, then running the computations on the previously stored data. Rather, parallel computing methods can provide target detection to an operator in real time or at near-real time.

Additional System Information

Figure 8:
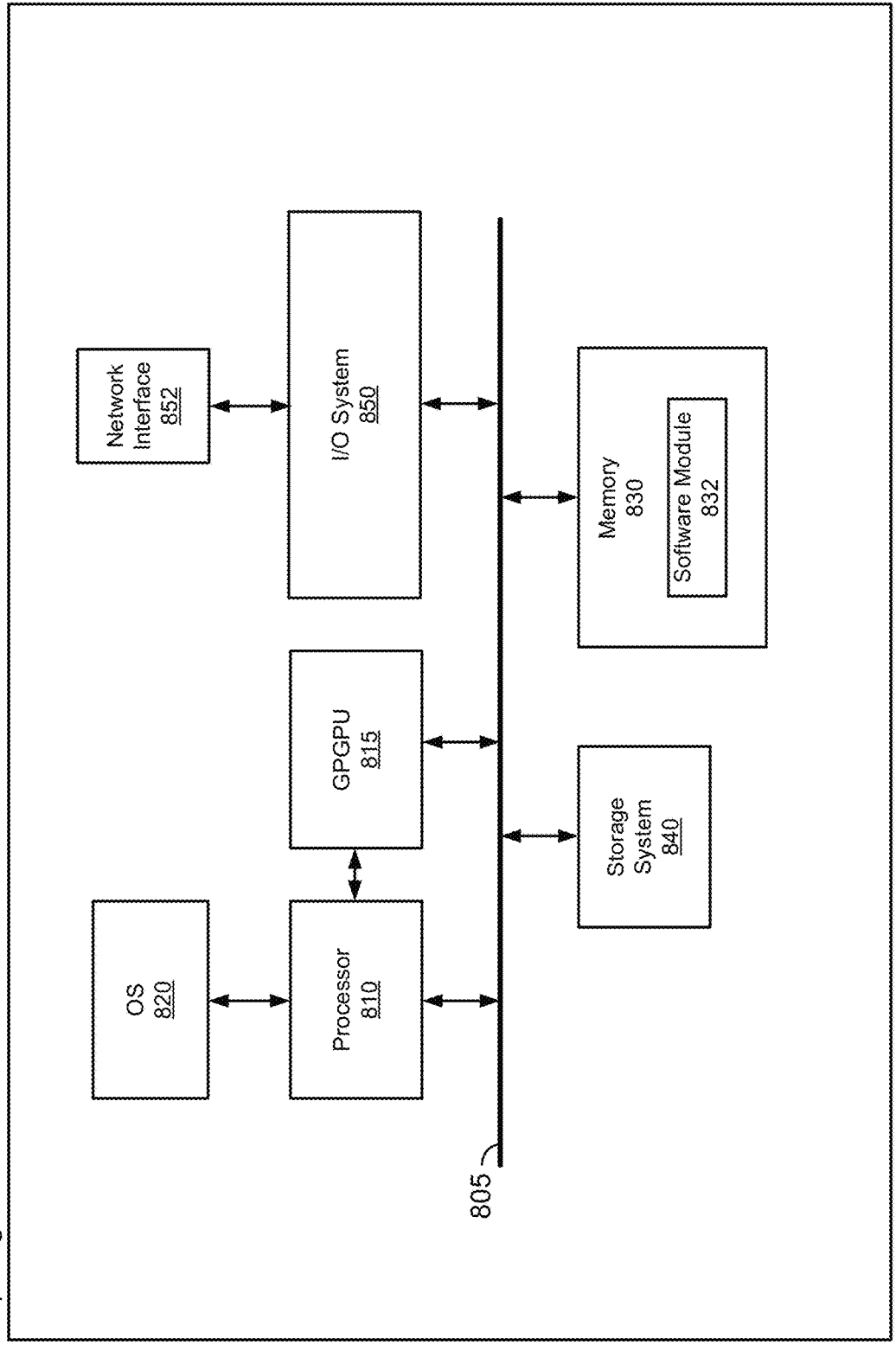
FIG. 8 depicts a block diagram of an example architecture of a computing device, in accordance with an embodiment of present disclosure.

FIG. 8 is a block diagram schematically illustrating a computing device 800, in accordance with certain of the embodiments disclosed herein. For example, computing device 800 can be integrated into spatial subspace detector 100 and include, for example, processor 106 as shown in FIG. 1 and described herein.

In certain implementations, the computing device 800 can include any combination of a processor 810, a GPGPU, a memory 830, a storage system 840, and an input/output (I/O) system 850. As can be further seen, a bus and/or interconnect 805 is also provided to allow for communication between the various components listed above and/or other components not shown. Other componentry and functionality not reflected in the block diagram of FIG. 8 will be apparent in light of this disclosure, and it will be appreciated that other embodiments are not limited to any particular hardware configuration.

The processor 810 can be any suitable processor, and may include one or more coprocessors or controllers, such as an audio processor, a graphics processing unit, or hardware accelerator, to assist in control and processing operations associated with computing device 800. In some embodiments, the processor 810 can be implemented as any number of processor cores. The processor (or processor cores) can be any type of processor, such as, for example, a microprocessor, an embedded processor, a digital signal processor (DSP), a graphics processor (GPU), a network processor, a field programmable gate array or other device configured to execute code. The processors can be multithreaded cores in that they may include more than one hardware thread context (or "logical processor") per core. Processor 810 can be implemented as a complex instruction set computer (CISC) or a reduced instruction set computer (RISC) processor.

As shown in FIG. 8, in certain implementations the processor can be operably coupled to the GPGPU 815. In certain implementations, the GPGPU can include a multi-core processing unit configured to run multiple tasks in parallel. For examples, the processing of covariance matrices as described herein as being performed in parallel can be implemented by GPGPU as shown in FIG. 8. In some examples, the GPGPU can be configured to implement a multi-core processing platform such as CUDA® developed by Nvidia or another similar processing platform. In certain examples, the GPGPU can include a Tesla V100 GPGPU as developed and manufactured by Nvidia.

In certain implementations, the processor 810 can be configured to execute an Operating System (OS) 820 which may comprise any suitable operating system, such as Google Android (Google Inc., Mountain View, Calif.), Microsoft Windows (Microsoft Corp., Redmond, Wash.), Apple OS X (Apple Inc., Cupertino, Calif.), Linux, or a real-time operating system (RTOS). As will be appreciated in light of this disclosure, the techniques provided herein can be implemented without regard to the particular operating system provided in conjunction with computing device 800, and therefore may also be implemented using any suitable existing or subsequently-developed platform.

The memory 830 can be implemented using any suitable type of digital storage including, for example, flash memory and/or random-access memory (RAM). In some embodiments, the memory 830 can include various layers of memory hierarchy and/or memory caches as are known to those of skill in the art. The memory 830 can be implemented as a volatile memory device such as, but not limited to, a RAM, dynamic RAM (DRAM), or static RAM (SRAM) device. The storage system 840 can be implemented as a non-volatile storage device such as, but not limited to, one or more of a hard disk drive (HDD), a solid-state drive (SSD), a universal serial bus (USB) drive, an optical disk drive, tape drive, an internal storage device, an attached storage device, flash memory, battery backed-up synchronous DRAM (SDRAM), and/or a network accessible storage device.

In certain implementations, the memory 830 can include one or more software modules such as software module 832 as shown in FIG. 8. The various software modules can include instructions that, when executed by processor 810, can cause the processor to perform one or more of the process steps and functions as described herein. For example, if computing device 800 represents the processor 106 as described herein, the software module 832 can include instructions for causing the GPGPU (or a combination of the processor 810 and GPGPU) to implement the signal processing and spatial HSA processes as shown in, for example, FIGS. 4 and 5, and described herein above.

The I/O system 850 can be configured to interface between various I/O devices and other components of the computing device 800. The I/O system can be operably coupled to a network interface 852 that is configured to provide one or more data connections between computing device 800 and external data communication networks. In some examples, additional I/O devices can include, for example, a user interface or a display.

It will be appreciated that in some embodiments, the various components of computing device 800 can be combined or integrated in a system-on-a-chip (SoC) architecture. In some embodiments, the components may be hardware components, firmware components, software components or any suitable combination of hardware, firmware or software.

The various embodiments disclosed herein can be implemented in various forms of hardware, software, firmware, and/or special purpose processors. For example, in one embodiment at least one non-transitory computer readable storage medium has instructions encoded thereon that, when executed by one or more processors, cause one or more of the methodologies disclosed herein to be implemented. Other componentry and functionality not reflected in the illustrations will be apparent in light of this disclosure, and it will be appreciated that other embodiments are not limited to any particular hardware or software configuration. Thus, in other embodiments the computing device 800 can include additional, fewer, or alternative subcomponents as compared to those included in the example embodiment of FIG. 8.

Further Example Embodiments

The following examples pertain to further embodiments, from which numerous permutations and configurations will be apparent. It should be noted that the following examples are directed to implementations involving the sending device, but similar examples can be envisioned regarding the security server and the recipient device.

Example 1 includes a system for identifying a narrowband signal within a wide instantaneous bandwidth, the system including an antenna array including a plurality of antenna elements; a plurality of receivers, each of the plurality of receivers being operably coupled to one of the plurality of antenna elements and configured to receive a wideband signal collected over a period of time from an associated antenna element and output one of a plurality of output signals; and a processor operably coupled to the plurality of receivers, the processor being configured to receive the plurality of output signals, filter at least a portion of the plurality of output signals to a narrow bandwidth of interest to produce a plurality of filtered signals, estimate a plurality of covariance matrices, wherein each of the plurality of covariance matrices is associated with one of the plurality of filtered signals, determine an Eigenvalue for two or more of the plurality of covariance matrices, thereby producing a set of Eigenvalues, analyze each of the set of Eigenvalues to determine a rank change estimate for at least a portion of the plurality of filtered signals, identify one or more of the plurality of filtered signals that have a positive rank change estimate, compute a beam forming weight and direction estimate for the one or more of the plurality of filtered signals that have a positive rank change estimate, and output an indication of the one or more of the plurality of filtered signals that have a positive rank change estimate, the indication including one or more of fine timing information, the beam forming weight, and the direction estimate.

Example 2 includes the subject matter of Example 1, wherein filtering at least a portion of the plurality of output signals includes channelizing at least the portion of the plurality of output signals into one of a plurality of frequency bands.

Example 3 includes the subject matter of Example 2, wherein a size of at least one of the plurality of frequency bands is set based upon the narrow bandwidth of interest.

Example 4 includes the subject matter of any of the preceding Examples, wherein computing a beam forming weight and direction estimate for the one or more of the plurality of filtered signals that have a positive rank change estimate includes determining a set of Eigenvectors for one or more covariance matrices associated with a filtered signal that has a positive rank change estimate; determining a principle Eigenvector from a whitened covariance matrix determined using the set of Eigenvectors and the covariance matrices; determining the beam forming weight based upon the principle Eigenvector; and determining the direction estimate based upon an angle of arrival of at least one Eigenvector of the set of Eigenvectors.

Example 5 includes the subject matter of any of the preceding Examples, wherein each of the plurality of filtered signals are simultaneously processed in parallel.

Example 6 includes the subject matter of any of the preceding Examples, further including clustering two or more of the plurality of filtered signals if a signal of interest is wider than the narrow bandwidth of interest.

Example 7 includes the subject matter of any of the preceding Examples, wherein spacing between the plurality of antenna elements in the antenna array is determined based upon the narrow bandwidth of interest.

Example 8 includes a method of identifying a narrowband signal within a wide instantaneous bandwidth, the method including receiving, by a processor, a plurality of output signals; filtering, by the processor, at least a portion of the plurality of output signals to a narrow bandwidth of interest to produce a plurality of filtered signals; estimating, by the processor, a plurality of covariance matrices, wherein each of the plurality of covariance matrices is associated with one of the plurality of filtered signals; determining, by the processor, an Eigenvalue for two or more of the plurality of covariance matrices, thereby producing a set of Eigenvalues; analyzing, by the processor, each of the set of Eigenvalues to determine a rank change estimate for at least a portion of the plurality of filtered signals; identifying, by the processor, one or more of the plurality of filtered signals that have a positive rank change estimate; computing, by the processor, a beam forming weight and direction estimate for the one or more of the plurality of filtered signals that have with a positive rank change estimate; and outputting, by the processor, an indication of the one or more of the plurality of filtered signals that have a positive rank change estimate, the indication including one or more of fine timing information, the beam forming weight, and the direction estimate.

Example 9 includes the subject matter of Example 8, wherein filtering at least a portion of the plurality of output signals includes channelizing, by the processor, at least a portion of the plurality of output signals into one of a plurality of frequency bands.

Example 10 includes the subject matter of Example 9, wherein a size of at least one of the plurality of frequency bands is set based upon the narrow bandwidth of interest.

Example 11 includes the subject matter of any of Examples 8-10, wherein computing a beam forming weight and direction estimate for the one or more of the plurality of filtered signals that have a positive rank change estimate includes determining, by the processor, a set of Eigenvectors for one or more covariance matrices associated with a filtered signal that has a positive rank change estimate; determining, by the processor, a principle Eigenvector from a whitened covariance matrix determined using the set of Eigenvectors and the covariance matrices; determining, by the processor, the beam forming weight based upon the principle Eigenvector; and determining, by the processor, the direction estimate based upon an angle of arrival of at least one Eigenvector of the set of Eigenvectors.

Example 12 includes the subject matter of any of Examples 8-11, wherein each of the plurality of filtered signals are simultaneously processed in parallel.

Example 13 includes the subject matter of any of Examples 8-12, further including clustering, by the processor, two or more of the plurality of filtered signals if a signal of interest is wider than the narrow bandwidth of interest.

Example 14 includes the subject matter of any of Examples 8-13, further including receiving, by each of a plurality of receivers, a wideband signal collected over a period of time from an associated antenna element; and outputting, by each of a plurality of receivers, one of a plurality of output signals to the processor.

Example 15 includes a computer program product including one or more non-transitory machine-readable mediums encoded with instructions that when executed by one or more processors cause a process to be carried out for identifying a narrowband signal within a wide instantaneous bandwidth, the process including receiving a plurality of output signals, filtering at least a portion of the plurality of output signals to a narrow bandwidth of interest to produce a plurality of filtered signals, estimating a plurality of covariance matrices, wherein each of the plurality of covariance matrices is associated with one of the plurality of filtered signals, determining an Eigenvalue for two or more of the plurality of covariance matrices, thereby producing a set of Eigenvalues, analyzing each of the set of Eigenvalues to determine a rank change estimate for at least a portion of the plurality of filtered signals, identifying one or more of the plurality of filtered signals that have a positive rank change estimate, computing a beam forming weight and direction estimate for the one or more of the plurality of filtered signals that have a positive rank change estimate, and outputting an indication of the one or more of the plurality of filtered signals that have a positive rank change estimate, the indication including one or more of fine timing information, the beam forming weight, and the direction estimate.

Example 16 includes the subject matter of Example 15, wherein filtering at least a portion of the plurality of output signals includes channelizing at least the portion of the plurality of output signals into one of a plurality of frequency bands.

Example 17 includes the subject matter of Example 16, wherein a size at least one of the plurality of frequency bands is set based upon the narrow bandwidth of interest.

Example 18 includes the subject matter of any of Examples 15-17, wherein computing a beam forming weight and direction estimate for the one or more of the plurality of filtered signals that have a positive rank change estimate includes determining a set of Eigenvectors for one or more covariance matrices associated with a filtered signal that has a positive rank change estimate; determining a principle Eigenvector from a whitened covariance matrix determined using the set of Eigenvectors and the covariance matrices; determining the beam forming weight based upon the principle Eigenvector; and determining the direction estimate based upon an angle of arrival of at least one Eigenvector of the set of Eigenvectors.

Example 19 includes the subject matter of any of Examples 15-18, wherein each of the plurality of filtered signals are simultaneously processed in parallel.

Example 20 includes the subject matter of any of Examples 15-19, wherein the process further includes clustering two or more of the plurality of filtered signals if a signal of interest is wider than the narrow bandwidth of interest.

Terms used in the present disclosure and in the appended claims (e.g., bodies of the appended claims) are generally intended as "open" terms (e.g., the term "including" should be interpreted as "including, but not limited to," the term "having" should be interpreted as "having at least," the term "includes" should be interpreted as "includes, but is not limited to," etc.).

Additionally, if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to embodiments containing only one such recitation, even when the same claim includes the introductory phrases "one or more" or "at least one" and indefinite articles such as "a" or "an" (e.g., "a" and/or "an" should be interpreted to mean "at least one" or "one or more"); the same holds true for the use of definite articles used to introduce claim recitations.

In addition, even if a specific number of an introduced claim recitation is explicitly recited, such recitation should be interpreted to mean at least the recited number (e.g., the bare recitation of "two widgets," without other modifiers, means at least two widgets, or two or more widgets). Furthermore, in those instances where a convention analogous to "at least one of A, B, and C, etc." or "one or more of A, B, and C, etc." is used, in general such a construction is intended to include A alone, B alone, C alone, A and B together, A and C together, B and C together, or A, B, and C together, etc.

All examples and conditional language recited in the present disclosure are intended for pedagogical examples to aid the reader in understanding the present disclosure and are to be construed as being without limitation to such specifically recited examples and conditions. Although example embodiments of the present disclosure have been described in detail, various changes, substitutions, and alterations could be made hereto without departing from the spirit and scope of the present disclosure. Accordingly, it is intended that the scope of the present disclosure be limited not by this detailed description, but rather by the claims appended hereto.

What is claimed is:

1. A system for identifying a narrowband signal within a wide instantaneous bandwidth, the system comprising:
   an antenna array comprising a plurality of antenna elements;
   a plurality of receivers, each of the plurality of receivers being operably coupled to one of the plurality of antenna elements and configured to receive a wideband signal collected over a period of time from an associated antenna element and output one of a plurality of output signals; and
   a processor operably coupled to the plurality of receivers, the processor being configured to
      receive the plurality of output signals,
      filter at least a portion of the plurality of output signals to a narrow bandwidth of interest to produce a plurality of filtered signals,
      estimate a plurality of covariance matrices, wherein each of the plurality of covariance matrices is associated with one of the plurality of filtered signals, determine an Eigenvalue for two or more of the plurality of covariance matrices, thereby producing a set of Eigenvalues, analyze each of the set of Eigenvalues to determine a rank change estimate for at least a portion of the plurality of filtered signals, identify one or more of the plurality of filtered signals that have a positive rank change estimate, compute a beam forming weight and direction estimate for the one or more of the plurality of filtered signals that have a positive rank change estimate, and output an indication of the one or more of the plurality of filtered signals that have a positive rank change estimate, the indication comprising one or more of fine timing information, the beam forming weight, and the direction estimate.

2. The system of claim 1, wherein filtering at least a portion of the plurality of output signals comprises channelizing at least the portion of the plurality of output signals into one of a plurality of frequency bands.

3. The system of claim 2, wherein a size of at least one of the plurality of frequency bands is set based upon the narrow bandwidth of interest.

4. The system of claim 1, wherein computing a beam forming weight and direction estimate for the one or more of the plurality of filtered signals that have a positive rank change estimate comprises:

determining a set of Eigenvectors for one or more covariance matrices associated with a filtered signal that has a positive rank change estimate;

determining a principle Eigenvector from a whitened covariance matrix determined using the set of Eigenvectors and the covariance matrices;

determining the beam forming weight based upon the principle Eigenvector; and determining the direction estimate based upon an angle of arrival of at least one Eigenvector of the set of Eigenvectors.

5. The system of claim 1, wherein each of the plurality of filtered signals are simultaneously processed in parallel.

6. The system of claim 1, further comprising clustering two or more of the plurality of filtered signals if a signal of interest is wider than the narrow bandwidth of interest.

7. The system of claim 1, wherein spacing between the plurality of antenna elements in the antenna array is determined based upon the narrow bandwidth of interest.

8. A method of identifying a narrowband signal within a wide instantaneous bandwidth, the method comprising:

receiving, by a processor, a plurality of output signals;

filtering, by the processor, at least a portion of the plurality of output signals to a narrow bandwidth of interest to produce a plurality of filtered signals;

estimating, by the processor, a plurality of covariance matrices, wherein each of the plurality of covariance matrices is associated with one of the plurality of filtered signals;

determining, by the processor, an Eigenvalue for two or more of the plurality of covariance matrices, thereby producing a set of Eigenvalues;

analyzing, by the processor, each of the set of Eigenvalues to determine a rank change estimate for at least a portion of the plurality of filtered signals;

identifying, by the processor, one or more of the plurality of filtered signals that have a positive rank change estimate;

computing, by the processor, a beam forming weight and direction estimate for the one or more of the plurality of filtered signals that have with a positive rank change estimate; and outputting, by the processor, an indication of the one or more of the plurality of filtered signals that have a positive rank change estimate, the indication comprising one or more of fine timing information, the beam forming weight, and the direction estimate.

9. The method of claim 8, wherein filtering at least a portion of the plurality of output signals comprises channelizing, by the processor, at least a portion of the plurality of output signals into one of a plurality of frequency bands.

10. The method of claim 9, wherein a size of at least one of the plurality of frequency bands is set based upon the narrow bandwidth of interest.

11. The method of claim 8, wherein computing a beam forming weight and direction estimate for the one or more of the plurality of filtered signals that have a positive rank change estimate comprises:

determining, by the processor, a set of Eigenvectors for one or more covariance matrices associated with a filtered signal that has a positive rank change estimate;

determining, by the processor, a principle Eigenvector from a whitened covariance matrix determined using the set of Eigenvectors and the covariance matrices;

determining, by the processor, the beam forming weight based upon the principle Eigenvector; and determining, by the processor, the direction estimate based upon an angle of arrival of at least one Eigenvector of the set of Eigenvectors.

12. The method of claim 8, wherein each of the plurality of filtered signals are simultaneously processed in parallel.

13. The method of claim 8, further comprising clustering, by the processor, two or more of the plurality of filtered signals if a signal of interest is wider than the narrow bandwidth of interest.

14. The method of claim 8, further comprising:

receiving, by each of a plurality of receivers, a wideband signal collected over a period of time from an associated antenna element; and outputting, by each of a plurality of receivers, one of a plurality of output signals to the processor.

15. A computer program product comprising one or more non-transitory machine-readable mediums encoded with instructions that when executed by one or more processors cause a process to be carried out for identifying a narrowband signal within a wide instantaneous bandwidth, the process comprising:

receiving a plurality of output signals;

filtering at least a portion of the plurality of output signals to a narrow bandwidth of interest to produce a plurality of filtered signals;

estimating a plurality of covariance matrices, wherein each of the plurality of covariance matrices is associated with one of the plurality of filtered signals;

determining an Eigenvalue for two or more of the plurality of covariance matrices, thereby producing a set of Eigenvalues;

analyzing each of the set of Eigenvalues to determine a rank change estimate for at least a portion of the plurality of filtered signals;

identifying one or more of the plurality of filtered signals that have a positive rank change estimate;

computing a beam forming weight and direction estimate for the one or more of the plurality of filtered signals that have a positive rank change estimate; and outputting an indication of the one or more of the plurality of filtered signals that have a positive rank change estimate, the indication comprising one or more of fine timing information, the beam forming weight, and the direction estimate.

16. The computer program product of claim 15, wherein filtering at least a portion of the plurality of output signals comprises channelizing at least the portion of the plurality of output signals into one of a plurality of frequency bands.

17. The computer program product of claim 16, wherein a size at least one of the plurality of frequency bands is set based upon the narrow bandwidth of interest.

18. The computer program product of claim 15, wherein computing a beam forming weight and direction estimate for the one or more of the plurality of filtered signals that have a positive rank change estimate comprises:

determining a set of Eigenvectors for one or more covariance matrices associated with a filtered signal that has a positive rank change estimate;

determining a principle Eigenvector from a whitened covariance matrix determined using the set of Eigenvectors and the covariance matrices;

determining the beam forming weight based upon the principle Eigenvector; and determining the direction estimate based upon an angle of arrival of at least one Eigenvector of the set of Eigenvectors.

19. The computer program product of claim 15, wherein each of the plurality of filtered signals are simultaneously processed in parallel.

20. The computer program product of claim 15, the process further comprising clustering two or more of the plurality of filtered signals if a signal of interest is wider than the narrow bandwidth of interest.

* * * * *